US008354490B2

(12) United States Patent
Wang et al.

(10) Patent No.: US 8,354,490 B2
(45) Date of Patent: Jan. 15, 2013

(54) METHOD FOR FUNCTIONALIZATION OF NANOSCALE FIBERS AND NANOSCALE FIBER FILMS

(75) Inventors: Shiren Wang, Lubbock, TX (US);
Zhiyong Liang, Tallahassee, FL (US);
Ben Wang, Tallahassee, FL (US); Chun Zhang, Tallahassee, FL (US)

(73) Assignee: Florida State University Research Foundation, Tallahassee, FL (US)

( * ) Notice: Subject to any disclaimer, the term of this patent is extended or adjusted under 35 U.S.C. 154(b) by 0 days.

(21) Appl. No.: 13/273,477

(22) Filed: Oct. 14, 2011

(65) Prior Publication Data
US 2012/0035343 A1 Feb. 9, 2012

Related U.S. Application Data

(62) Division of application No. 12/423,155, filed on Apr. 14, 2009, now Pat. No. 8,058,364.

(60) Provisional application No. 61/045,136, filed on Apr. 15, 2008.

(51) Int. Cl.
*C08G 63/42* (2006.01)
*C08G 63/06* (2006.01)
*C08G 63/00* (2006.01)

(52) U.S. Cl. ........ 528/297; 528/361; 528/366; 977/700; 977/750; 977/752; 977/847

(58) Field of Classification Search .................. 525/524; 977/750, 752, 700, 847; 528/297, 361, 366
See application file for complete search history.

(56) References Cited

U.S. PATENT DOCUMENTS

| 4,562,033 | A | 12/1985 | Johnson et al. |
|---|---|---|---|
| 6,036,857 | A | 3/2000 | Chen et al. |
| 6,569,937 | B2 | 5/2003 | Foulger et al. |
| 6,683,783 | B1 | 1/2004 | Smalley et al. |
| 6,723,299 | B1 | 4/2004 | Chen et al. |
| 6,741,019 | B1 | 5/2004 | Filas et al. |
| 7,105,596 | B2 | 9/2006 | Smalley et al. |
| 7,244,407 | B2 | 7/2007 | Chen et al. |
| 7,459,121 | B2 | 12/2008 | Liang et al. |
| 7,862,766 | B2 | 1/2011 | Liang et al. |
| 2001/0051272 | A1 | 12/2001 | Toyoda et al. |
| 2002/0094311 | A1 | 7/2002 | Smalley et al. |

(Continued)

FOREIGN PATENT DOCUMENTS

WO    2005/021845 A1    3/2005

(Continued)

OTHER PUBLICATIONS

Ajayan, et al., "Aligned Carbon Nanotube Arrays Formed by Cutting a Polymer Resin-Nanotube Composite," Science, vol. 265, pp. 1212-1214 (1994).

(Continued)

*Primary Examiner* — Peter F Godenschwager
*Assistant Examiner* — David Karst
(74) *Attorney, Agent, or Firm* — Sutherland Asbill & Brennan LLP

(57) ABSTRACT

A method is provided for functionalizing nanoscale fibers including reacting a plurality of nanoscale fibers with at least one epoxide monomer to chemically bond the at least one epoxide monomer to surfaces of the nanoscale fibers to form functionalized nanoscale fibers. Functionalized nanoscale fibers and nanoscale fiber films are also provided.

13 Claims, 14 Drawing Sheets

U.S. PATENT DOCUMENTS

| | | | |
|---|---|---|---|
| 2004/0101634 | A1 | 5/2004 | Park et al. |
| 2004/0241436 | A1* | 12/2004 | Hsieh et al. ............... 428/361 |
| 2005/0154116 | A1 | 7/2005 | Nagy et al. |
| 2005/0239948 | A1 | 10/2005 | Haik et al. |
| 2006/0017191 | A1 | 1/2006 | Liang et al. |
| 2006/0062985 | A1* | 3/2006 | Karandikar ............. 428/292.1 |
| 2006/0166003 | A1 | 7/2006 | Khabashesku et al. |
| 2006/0217482 | A1 | 9/2006 | Lukehart et al. |
| 2007/0176319 | A1 | 8/2007 | Thostenson et al. |
| 2008/0057265 | A1 | 3/2008 | Liang et al. |
| 2008/0280115 | A1 | 11/2008 | Liang et al. |

FOREIGN PATENT DOCUMENTS

| | | |
|---|---|---|
| WO | 2007/029934 A1 | 3/2007 |

OTHER PUBLICATIONS

Ajayan, et all, "Single-Walled Carbon Nanotube-Polymer Composites: Strength and Weakness," Advanced Materials 12:750-753 (2000).

Andrews, et al., "Nanotube composite carbon fibers," Applied Physics Letters, 75(9): pp. 1329-1331 (1999).

Chattopadhyay, Jayanta, et al., "SET Mechanism in the Functionalization of Single-Walled Carbon Nanotubes," J. Phys. Chem. C, 111, 17928-17932 (2007).

Chauvet, et al., "Magnetic anisotropies of aligned carbon nanotubes," The American Physical Society, 52(10): pp. 6963-6966 (1995).

Chen, et al., "Electrochemical synthesis of polypyrrole/carbon nanotube nanoscale composites using well-aligned carbon nanotube arrays," Applied Physics A, vol. 73, pp. 129-131 (2001).

Cho, et al., "Carbon nanotube synthesis using a magnetic field via thermal chemical vapor deposition," Journal of Crystal Growth 243, 2002, pp. 224-229.

Cooper, et al., "Distribution and Alignment of Carbon Nanotubes and Nanofibrils in a Polymer Matrix," Composites Science and Technology 62:1105-1112 (2002).

Dai, Title: "Carbon Nanotubes Opportunities and Challenges," Surface Science 500 (2002), pp. 218-241.

de Heer, et al., "Aligned Carbon Nanotube Films: Production and Optical and Electronic Properties," Science 268:845-847 (1995).

Dresselhaus, et al., "Synthesis of Graphite Fibers and Filaments," M. Cardon, Ed., pp. 12-34 (1988).

Durgun, E., et al., "Systematic study of adsorption of single atoms on a carbon nanotube," Physical Review B 67, 201401R 2003, pp. 1-4.

Endo, et al., Title: "Buckypaper from Coaxial Nanotubes," Nature/vol. 433/Feb. 3, 2005/www.nature.com/nature; pp. 476.

Fan, et al., "Self-Oriented Regular Arrays of Carbon Nanotubes and Their Field Emission Properties," Science 283:512-514 (1999).

Fugiwara, et al., "Magnetic Orientation and Magnetic Properties of a Single Carbon Nanotube," The Journal of Physical Chemistry, 105(18): pp. 4383-4386 (2001).

Garg, et al., "Effect of chemical functionalization on the mechanical properties of carbon nanotubes," Chemical Physics Letters, 295(4): pp. 273-278 (1998). Abstract.

Gou, et al., "Experimental Design and Optimization of Dispersion Process for Single-Walled Carbon Nanotube Bucky Paper," International Journal of Nanoscience, 3(3), 293-307, (2004).

Gou, et al., Title: "Development of Nanotube Bucky Paper/Epoxy Nanocomposites," Proceedings of the TEXCOMP-6 International Symposium on textile Composites, Sep. 11-13, 2002, pp. 1-5.

Gou, et al., Title: "Process Analysis and Optimization of SWNT Bucky Paper Reinforce Epoxy Composites," Proceedings of the 48th International Society for Advancement of Material Process Engineering (SAMPE) Symposium and Exhibition, Long Beach, CA May 12-14, 2003, pp. 1-12.

Haggenmueller, et al., "Aligned single-wall carbon nanotubes in composites by melt processing methods," Chemical Physics Letters 330, Nov. 10, 2000, pp. 219-225.

Hertel, et al., "Deformation of Carbon Nanotubes by Surface van der Waals Forces," Physical Review B. 58:13870-13873 (1998).

Holloway, et al., "Texture Development Due to Preferential Grain Growth of Ho-Ba-Cu-O in 1.6-T Magnetic Field," J. Mat. Res. 8:727-733 (1993).

Kimura, et al., "Polymer Composites of Carbon Nanotubes Aligned by a Magnetic Field," Advanced Materials, v14 No. 19, Oct. 2, 2002, pp. 1380-1383.

Knez, et al., "Electrochemical modification of individual nano-objects," Journal of Electroanalytical Chemistry, vol. 522: pp. 70-74 (2002).

Kumar, et al., "Fibers from Polypropylene/Nano Carbon Fiber Composites," polymer 43:1701-1703 (2002).

Kyotani, et al., "Preparation of Ultrafine Carbon Tubes in Nanochannels of an Anodic Aluminum Oxide Film," Chem. Mater. 8:2109-2113 (1996).

Li, et al., "Large-Scale Synthesis of Aligned Carbon Nanotubes," Science 274:1701-1703 (1996).

Li, Yan-Hui, et al., "Adsoprtion of cadmium(II) from aqueous solution by surface oxidized carbon nanotubes," Carbon 41 (2003), pp. 1057-1062.

Liang, et al., Molecular Dynamic Simulation and Experimental Investigation of Filling Chopped SWNTS with Resin Matrix Molecules to Enhance Interfacial Bonding and Loading Transfer in Nanocomposites, SAMPE 2004, Long Beach, CA , May 16-24, 2004, pp. 1-8.

Lourie, et al., "Evaluation of Young's modulus of carbon nanotubes by micro-Raman spectroscopy," Journal of Materials Research, 13(9): pp. 2418-2422 (1998).

Ni, et al., "Chemical Functionalization of Carbon Nanotubes through Energetic Radical Collisions," Physical Review B. 61:R16343-R16346(2000).

Qian, et al., "Load transfer and deformation mechanism in carbon nanotube-polystyrene composites," Applied Physics Letters, 76(20): pp. 2868-2870 (2000).

Raymundo-Piñero, et al., "High surface area carbon nanotubes prepared by chemical activation," Carbon 40 (2002), pp. 1614-1617.

Smith, et al., "Structural anisotropy of magnetically aligned single wall carbon nanotube films," Applied Physics Letters (77(5): pp. 663-665 (2000).

Stéphan, et al., "Characterization of singlewalled carbon nanotubes-PMMA composites," Synthetic metals, 108(2): pp. 139-149 (2000). Abstract.

Thostenson, et al., "Advances in the science and technology of carbon nanotubes and their composites: a review," Composites Science and Technology 61, 2001, pp. 1899-1912.

Thostenson, et al., "Nanocomposites in context," Composites Science and Technology 65:491-516 (2005).

Treacy, et al., "Exceptionally High Young's Modulus Observed for Individual Carbon Nanotubes," Nature 381:678-680 (1996).

Velasco-Santos, et al., "Chemical Functionalization of Carbon Nanotubes through an Organosilane," Nanotechnology 13:495-498 (2000).

Velasco-Santos, et al., "Chemical functionalization of carbon nanotubes through an organosilane," Nanotechnology, vol. 13, pp. 495-498 (2002). Abstract.

Wang, et al., "Growth and characterization of buckybundles," Applied Physics Letters, 62(16): pp. 1881-1883 (1993).

Wang, et al., Title: "Fabrication and Characterization of In-Plane Aligned Nanotube Composites with Magnetically Aligned Carbon Nanotube Bucky Papers," Proc. 14th Int. Conf. on Composite Materials (ICCM-14), 1 (San Diego, CA, Jul. 14-18),—(2003) pp. 1-7.

Wang, Shiren, "Functionalization of Carbon Nanotubes: Characterization, Modeling and Composite Applications," A dissertation submitted to the Department of Industrial and Manufacturing Engineering in partial fulfillment of the requirements for the degree of Doctor of Philosophy, The Florida State University College of Engineering (2006).

Wang, Shiren, et al., "Epoxide-terminated carbon nanotubes," Letters to the Editor, Carbon 45 (2007) 3042-3059.

Wang, Shiren, et al., "Reinforcing polymer composites with epoxide-grafted carbon nanotubes," Nanotechnology 19 (2008) 085710, pp. 1-7.

Wikipedia, Title: "Carbon Nanotube," Date: Jan. 9, 2006, pp. 1-7.

Wood, et al., "Orientation of Carbon Nanotubes in Polymers and its Detection by Raman Spectroscopy," Composites: Part A 32:391-399 (2001).

Wu, et al., "Deposition of Nanotube Composites using Matrix-Assisted Pulsed Laser Evaporation," Materials Research Society Symposium, vol. 617, 2000, pp. J2.3.1-J2.3.6.

* cited by examiner

Step 1: Initiation

Step 2: Propagation

Step 3: Termination

— · — Pure epoxy
— · · — F-Cnano MWNTs 5.7wt%
———— F-Cnano MWNTs 11.6wt%
——— F-nanocomp MWNTs 6.85wt%
— — — F-nanocomp MWNTs 11.78wt%

METHOD FOR FUNCTIONALIZATION OF NANOSCALE FIBERS AND NANOSCALE FIBER FILMS

CROSS REFERENCE TO RELATED APPLICATIONS

This application is a divisional of U.S. application Ser. No. 12/423,155, filed Apr. 14, 2009, now U.S. Pat. No. 8,058,364, which claims priority to U.S. Provisional Application No. 61/045,136, filed Apr. 15, 2008. Both applications are incorporated herein by reference.

BACKGROUND OF THE INVENTION

This invention relates generally to carbon nanotubes and nanofibers, and more particularly to methods for producing functionalized nanotubes, nanofibers, and nanoscale fiber films.

Carbon nanotubes and nanofibers have both rigidity and strength properties, such as high elasticity, large elastic strains, and fracture strain sustaining capabilities. Such a combination of properties is generally not present in conventional materials. In addition, carbon nanotubes and nanofibers are some of the strongest fibers currently known. For example, the Young's Modulus of single-walled carbon nanotubes can be about 1 TPa, which is about five times greater than that for steel (about 200 GPa), yet the density of the carbon nanotubes is about 1.2 $g/cm^3$ to about 1.4 $g/cm^3$. The tensile strength of single-walled carbon nanotubes is generally in the range of about 50 GPa to about 200 GPa. This tensile strength indicates that composite materials made of carbon nanotubes and/or nanofibers could likely be lighter and stronger as compared to current high-performance carbon fiber-based composites.

In addition to their exceptional mechanical properties, carbon nanotubes and nanofibers may provide either metallic or semiconductor characteristics based on the chiral structure of fullerene. Some carbon nanotubes and nanofibers also possess superior thermal and electrical properties such as thermal stability up to about 2800° C. in a vacuum and about 750° C. in air, thermal conductivity about twice as much as that of diamond, and an electric current transfer capacity about 1000 times greater than that of copper wire. Therefore, carbon nanotubes and nanofibers are regarded as one of the most promising reinforcement materials for the next generation of high-performance structural and multifunctional composites.

The use of nanoscale fibers in applications such as electronics, optics, thermal management, and high-performance composites have been hindered by technical roadblocks such as difficulties in their dispersion and their inert characteristics. Nanoscale fibers tend to form large bundles or big ropes, which may significantly limit potential applications. Conventional oxidization functionalization methods may etch the sidewalls, which may undesirably alter their mechanical properties. Effective functionalization to enhance dispersion, interfacial bonding, and functionality may be crucial to successfully transferring the exceptional properties of carbon nanotubes and nanofibers into many engineering applications.

Films of carbon nanotubes and nanofibers, or buckypapers, are a potentially important material platform for many applications. Typically, the films are thin, preformed sheets of well-controlled and dispersed porous networks of single-walled carbon nanotubes (SWNTs), multiple-walled carbon nanotubes (MWNTs), carbon nanofibers (CNFs), or mixtures thereof. The carbon nanotube and nanofiber film materials are flexible, light weight, and have mechanical, conductivity, and corrosion resistance properties desirable for numerous applications. The film form also makes nanoscale materials and their properties transferable to a macroscale material for ease of handling.

Epoxy polymers are easy to process and exhibit excellent mechanical properties with little toxicity. They are regarded as a standard matrix material for composites in various high-performance structural composite applications, where substantial strength, stiffness, durability, light weight, and good processability are required. For instance, epoxies have been used for years in the aerospace and boat industries. Carbon nanotube and/or nanofiber reinforced epoxy polymer composites are of interest in many applications; however, poor dispersion and weak interfacial bonding between carbon nanotubes and epoxy resin has hindered their widespread commercial adoption.

Fluorination may be used to modify nanoscale fiber functionality by additional reaction and yet have little effect on the mechanical properties of the nanoscale fibers. For example, fluorination can effectively enhance the functionality of nanoscale fiber films reinforced with polypropylene. However, fluorination is not always viable for carbon nanoscale fiber-epoxy film composites, for example, due to the negative effect of elemental fluorine on the epoxy curing reaction. Moreover, oxidization and fluorination functionalizations may result in very low yield rate and may involve long, multiple chemical reactions. Accordingly, scale-up and mass production using these approaches for functionalization may be difficult or cost ineffective.

It therefore would be desirable to provide functionalized nanoscale fibers and nanoscale fiber films which reduce or avoid the aforementioned deficiencies. In particular, it would be desirable to provide nanoscale fibers and nanoscale fiber films functionalized for composite applications. It also would be desirable to provide improved methods for functionalizing films for composite applications.

SUMMARY OF THE INVENTION

Methods to functionalize nanoscale fibers and to fabricate nanoscale fiber films functionalized for use in composite applications are provided. In certain embodiments, a method for functionalizing nanoscale fibers is provided. The method includes reacting a plurality of nanoscale fibers with at least one epoxide monomer to chemically bond the at least one epoxide monomer to surfaces of the nanoscale fibers to form functionalized nanoscale fibers.

In certain embodiments, the method further includes polymerizing the at least one epoxide monomer to form at least one polymer. In one embodiment, the steps of reacting and polymerizing occur substantially simultaneously. In another embodiment, the method further includes, before the step of reacting, dispersing the nanoscale fibers in a liquid which comprises the at least one epoxide monomer and, after the steps of reacting and polymerizing, removing all or a substantial portion of the liquid. In one embodiment, the step of removing the liquid includes filtering, vaporizing, or a combination thereof. In some embodiments, the step of removing the liquid includes forming a functionalized nanoscale fiber film composed of the functionalized nanoscale fibers.

In certain embodiments, the step of reacting includes adding a catalyst to the at least one epoxide monomer. In another embodiment, the catalyst is (or includes) a peroxide. In one embodiment, the peroxide comprises benzoyl peroxide.

In certain embodiments of the method, the epoxide monomer covalently bonds to the surfaces of the nanoscale fibers.

In one embodiment, the method further includes washing the functionalized nanoscale fibers. In one example, the nanoscale fibers are single-walled carbon nanotubes.

In another aspect, a functionalized nanoscale fiber is provided that includes a nanoscale fiber and at least one epoxide chemically bonded to a surface of the nanoscale fiber. In one embodiment, the epoxide is covalently bonded to the surface of the nanoscale fiber.

In some embodiments, the epoxide is glycidyl methacrylate, (7-octenyl)oxirane, 1,2-epoxy-5-hexene, 3,4-epoxy-1-butene, or a combination thereof. In certain embodiments, the epoxide is an epoxy polymer (e.g., poly-glycidyl methacrylate). In one embodiment, the nanoscale fiber is a single-walled carbon nanotube.

In a further aspect, a functionalized nanoscale fiber film is provided that includes a plurality of nanoscale fibers and at least one polymer chemically bonded to at least a portion of the nanoscale fibers. In certain embodiments, the polymer is covalently bonded to the nanoscale fibers. In one embodiment, the polymer comprises an epoxy polymer.

DETAILED DESCRIPTION OF THE INVENTION

Figure 1:
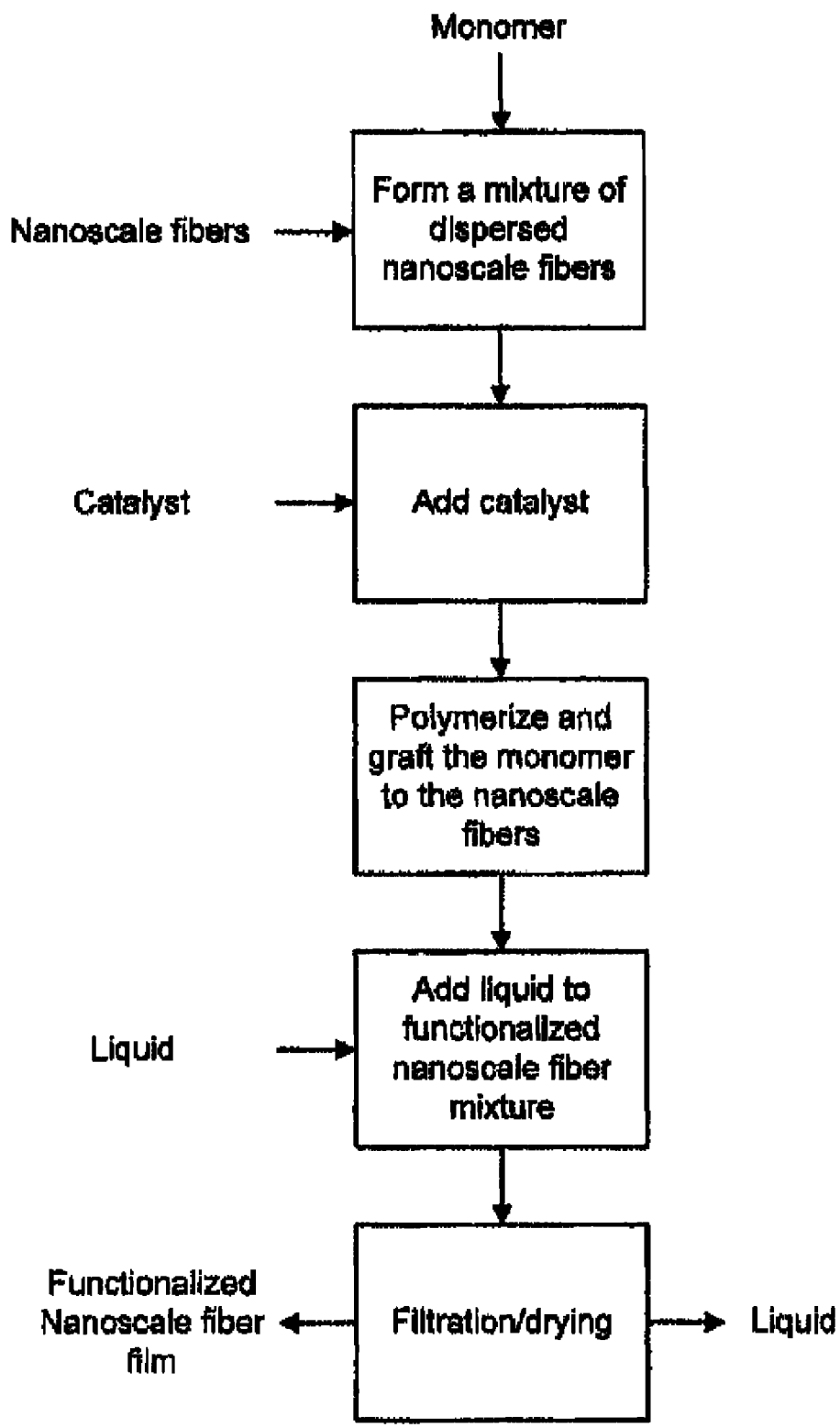
FIG. 1 is a process flow diagram illustrating one embodiment of the method for functionalizing carbon nanotubes.

Methods have been developed to functionalize nanoscale fibers and to fabricate nanoscale fiber films functionalized for use in composite applications. These methods advantageously provide techniques to enhance carbon nanotube and nanofiber dispersion, bundle exfoliation, and interfacial bonding in polymer-based nanotube and nanofiber nanocomposites. The developed methods beneficially avoid the multiple-step processes involving sequential chemical reactions associated with conventional chemical functionalization of nanoscale fibers.

Without wishing to be bound by any theory, the methods involve free-radical addition reactions which graft (i.e., chemically bond) molecules onto the nanoscale fibers' surfaces with minimal effect on the mechanical properties of the nanoscale fibers themselves. Thus, embodiments of the methods involve chemical reactions between the molecules and the surfaces of the nanoscale fibers. As used herein, "chemically bonded" or "chemical bond" refers to covalent bonds or ionic bonds between molecules and the atoms on the nanoscale fibers' surfaces resulting from a chemical reaction of the molecules and the atoms on the nanoscale fibers' surfaces. Examples of chemical bonds include covalent bonds and ionic bonds such as negatively charged $SWNT/Li^+$ bonding as described in Chattopadhyay, J. et al., "SET Mechanism in the Functionalization of Single-Walled Carbon Nanotubes," *J. Phys. Chem. C*, 2007, 111 (48), 17928-17932. As used herein, "covalently bonded" refers to the sharing of pairs of electrons between the molecules and the atoms on the nanoscale fibers' surfaces.

The yield rate using the methods may be almost 100%. In addition, the methods have the potential for low cost mass production and scale-up.

In some embodiments, the methods include in-situ polymerization reactions which polymerize and graft epoxide groups onto the surfaces of nanotubes and nanofibers to form functionalized nanoscale fibers. This in-situ polymerization can lead to high-exfoliation and uniform dispersion of carbon nanotubes or nanofibers in the polymer matrix during functionalization of the nanoscale fibers. In certain embodiments, the in-situ polymerization reaction can produce covalent bonds between nanotubes and/or nanofibers and the polymer matrix during composite fabrication through the grafted epoxide groups to substantially improve load-transfer between the nanoscale fibers and the polymer resin matrix.

Thus, the methods have the potential for use in the mass production of high-performance nanotube and nanofiber reinforced epoxy composites. These high-performance epoxy nanocomposites can be used for electromagnetic interference shielding, thermal management materials, and structural materials applications. Exemplary applications include composite applications for aircraft, thermal management for electronic device package, and the like.

As used herein, the terms "comprise," "comprising," "include," and "including" are intended to be open, non-limiting terms, unless the contrary is expressly indicated.

The Functionalization Methods

In certain embodiments, the method for functionalizing a plurality of nanoscale fibers comprises reacting the plurality of nanoscale fibers with at least one epoxide monomer to bond the at least one epoxide monomer to surfaces of the nanoscale fibers to form functionalized nanoscale fibers. In some embodiments, the epoxide monomer covalently bonds to surfaces of the nanoscale fibers. Thus, in some embodiments, the epoxide monomer is chemically bonded directly to the surface of the nanoscale fiber.

In certain embodiments, the method further comprises polymerizing the epoxide monomer to form at least one polymer. In various embodiments, the steps of reacting and polymerizing occur substantially simultaneously. As used herein, "substantially simultaneously" refers to the occurrence of steps during the same period of time such that there is little or no perceivable distinction between the two steps on a macroscale level.

In other embodiments, the method further comprises, before the step of reacting, dispersing the nanoscale fibers in an aqueous solution or other liquid which comprises the at least one epoxide monomer and, after the steps of reacting and polymerizing, removing all or a substantial portion of the liquid. As seen herein, "a substantial portion" means more than 50%, typically more than 70, 80%, 90%, or 99% of the liquid.

The step of reacting the epoxide monomer with the SWNTs, MWNTs and/or CNF may include adding a catalyst to the mixture, heating the mixture to a reaction temperature or cooling the mixture to a reaction temperature, agitating the mixture, or a combination thereof. Suitable equipment for heating, cooling, and agitation is known in the art.

The step of removing a substantial portion of any liquid in the mixture may include a filtration process, vaporizing any liquid in the mixture, or a combination thereof. For example, the liquid removal process may include, but is not limited to, evaporation (ambient temperature and pressure), drying, lyophilization, heating to vaporize, or using a vacuum.

As used herein, the terms "functionalization" and "functionalize" refer to the creation of cross-links, vacancies, knock-on carbon atoms, or pentagon/heptagon Stone-Wales defects, as well as various interconnections or junctions, in and/or among the nanoscale fibers, or any other changes that may increase nanoscale fiber dispersion, bundle exfoliation, and/or interfacial bonding of the nanoscale fibers and/or polymer in the nanoscale fiber film which result from the reaction to chemically bond the monomer to the surfaces of the nanoscale fibers. As used herein, term "catalyst" refers to any substance, such as a free radical initiator, which may be used to initiate the polymerization of a monomer, cause a chemical reaction between the nanoscale fibers and the monomer. In one embodiment, the catalyst (1) initializes the polymerization of the monomer or causes a chemical reaction between the nanoscale fibers and the monomer and (2) also reacts with the monomer.

In one embodiment, the functionalized nanoscale fibers and film materials are made by a method that includes the steps of (1) dispersing SWNTs, MWNTs, and/or CNFs in a epoxide monomer to form a mixture, (2) reacting the epoxide monomer and the SWNTs, MWNTs, and/or CNF to polymerize the epoxide monomer and form a polymer grafted onto a surface of the SWNTs, MWNTs, and/or CNFs, and then (3) removing some, all, or substantially all of any liquid in the mixture to recover the fibers or to form the film material.

In another aspect, the methods described herein are used to produce functionalized nanoscale fibers by a process that includes the steps of (1) dispersing SWNTs, MWNTs, and/or CNF in a liquid comprising an epoxide monomer to form a mixture; (2) reacting the epoxide monomer and the SWNTs, MWNTs, and/or CNF to polymerize the epoxide monomer and form a polymer; and (3) removing at least a substantial portion of any liquid in the mixture to form the functionalized nanoscale fibers. This liquid may include an inert vehicle and/or unreacted monomer.

FIG. 1 illustrates another embodiment of the method where the functionalized nanoscale fiber films may be made by dispersing nanoscale fibers in an epoxy monomer to form a mixture; adding a catalyst to the mixture; heating and agitating the mixture to polymerize the epoxy monomer; adding a liquid to the mixture; and then filtering the mixture to form dense conducting networks in thin films of functionalized SWNT, MWNT, CNF or their mixtures.

In some embodiments, the epoxide monomer comprises glycidyl methacrylate (GMA). In another embodiment, the epoxide monomer includes, but is not limited to, (7-octenyl) oxirane, 1,2-epoxy-5-hexene, or 3,4-epoxy-1-butene. Without wishing to be bound by any theory, it is believed that the epoxy group may be converted into different functionalities through a ring-opening reaction. The ring-opening capability provides various opportunities for applications involving composite interfacial improvements, polymer surface modifications, and high performance membranes. For instance, the cross-linking reaction of the epoxy groups under electron-beam exposures may create the potential for a high-sensitivity negative-tone electron-beam resistance. Therefore, grafting epoxy groups onto nanoscale fibers may allow for various applications using nanoscale fibers in functional devices.

Without wishing to be bound by any theory, the grafting of epoxy groups onto nanoscale fibers may have better processability as compared the grafting of other molecules onto nanoscale fibers. For example, the epoxy monomer materials may be less viscous than thermoplastic materials, which results in more even and/or easier dispersion of the nanoscale fibers.

Figure 2:
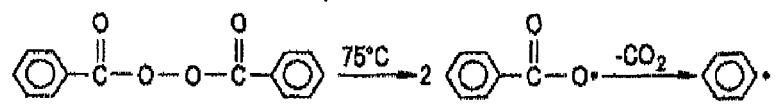
FIG. 2 illustrates an embodiment of a functionalization scheme showing the mechanism of chemical reactions for polymerization to graft epoxide groups onto nanotubes.
Figure 2:
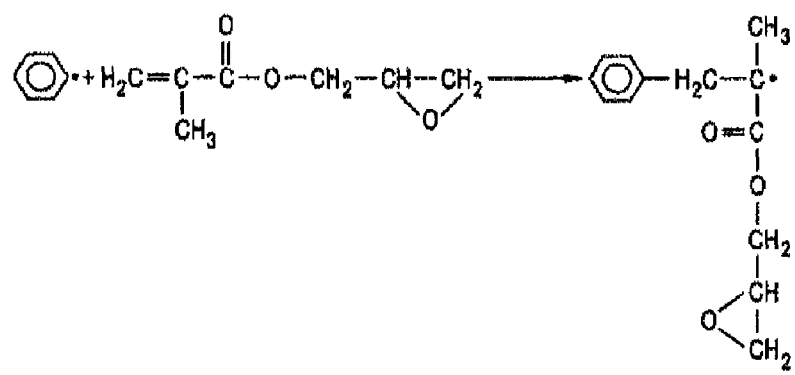
Figure 2:
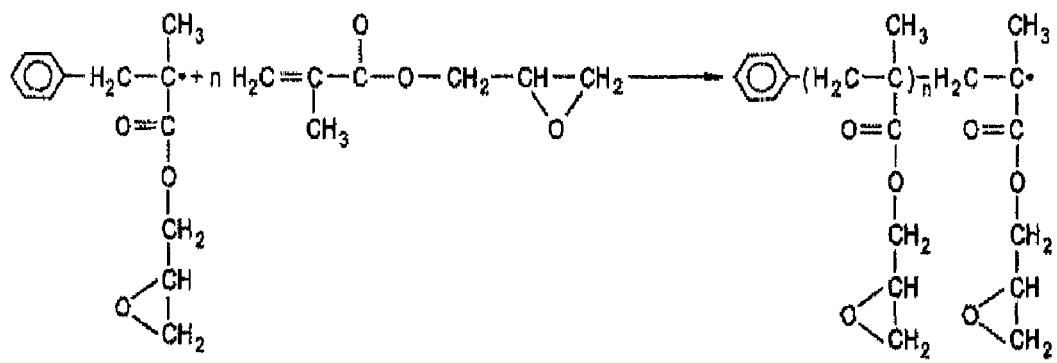
Figure 2:
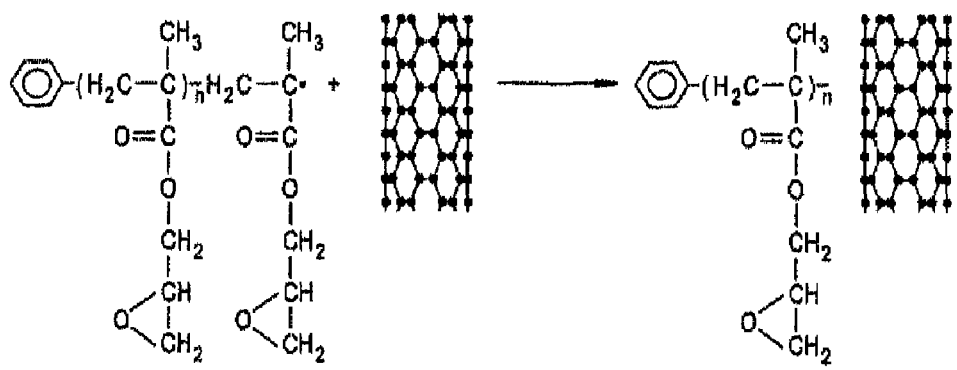

In one embodiment, the catalyst comprises benzoyl peroxide (BPO). In other embodiments, the catalyst is selected from hydroperoxides, ketone peroxides, peroxyesters, peroxycarbonates, diacylperosices, and cyclic ketone peroxides. Without wishing to be bound by any theory, it is believed that benzoyl peroxide can be used as a free radical initiator and that the peroxide bond can be dissociated at low temperatures (e.g., less than 150° C.). The half-life time for BPO in benzene is about 7 to 10 hours at 75° C. The formation of benzoyl radicals initializes the polymerization of glycidyl methacrylate. FIG. 2 shows an embodiment of a functionalization scheme showing the mechanism of chemical reactions for in-situ polymerization to graft epoxide groups onto nanotubes using a BPO catalyst. Termination can occur though the reaction of the propagating long-chain radical with SWNTs or other nanoscale fibers, resulting in epoxide-grafting the SWNTs. Hence, the epoxide-grafting can be realized with free radical additions. One of skill in the art will be able to select other appropriate catalysts, depending on, for example, the epoxide monomer and the composition of the mixture.

In one embodiment, the mixture is heated to a temperature of approximately 75° C. and vigorously agitated for a period of about 24 hours. One of skill in the art can select appropriate reaction temperatures, degrees of agitation, and reaction times, depending on, for example, the particular epoxide monomer and composition of the mixture.

The liquid includes a non-solvent, and optionally may include a surfactant (such as Triton X-100, Fisher Scientific Company, NJ) to enhance dispersion and suspension stabilization. As used herein, the term "non-solvent" refers to liquid media that essentially are non-reactive with the nanotubes and in which the nanotubes are virtually insoluble. Examples of suitable non-solvent liquid media include water, and volatile organic liquids, such as acetone, ethanol, methanol, n-hexane, benzene, dimethyl formamide, chloroform, methylene chloride, acetone, or various oils. Low-boiling point liquids are typically preferred so that the liquid can be easily and quickly removed from the matrix material. In addition, low viscosity liquids can be used to form dense conducting networks in the nanoscale fiber films.

In one embodiment, the functionalized nanoscale fibers are produced with better dispersion in liquids (e.g. non-solvents) as compared to the nanoscale fibers before functionalization.

Such embodiments allow for the separation of nanoscale fiber bundles into individual nanotubes or nanofibers.

The functionalized nanotubes and CNFs may be randomly dispersed, or may be aligned, in the produced films. In one embodiment, the nanoscale fibers may mixed with a quantity of a non-solvent to aids good dispersion before being dispersed in a non-solvent or in the epoxide monomer. In one embodiment, the mixture may be dispersed using ultrasonic processing. In some embodiments, the fabrication method further includes aligning the nanotubes in the nanoscale fiber film. For example, this may be done using filtration of the mixtures in high strength magnetic fields, as described for example, in U.S. Patent Application Publication No. 2005/0239948 to Haik et al.

In one embodiment, the functionalized nanoscale fiber film is washed. For instance, the films may be washed with one or more non-solvents, ground and dispersed in one or more non-solvents, or combinations thereof. In one embodiment, the films are repeatedly washed with acetone, ground and dispersed in benzene, and filtered to form a functionalized nanoscale fiber film until its weight is substantially constant.

In one embodiment, the functionalized nanoscale fibers and/or nanoscale fiber film is combined with another material, such as an epoxy resin (e.g., Epon 862) known in the art to produce composite materials.

In one embodiment, a functionalized nanoscale fiber composite is made by dispersing functionalized nanoscale fibers in a liquid, filtering or drying the functionalized nanoscale fibers to form a mat, impregnating the functionalized nanoscale fiber mat with an epoxy solution, and pressing and curing the functionalized nanoscale fiber mat impregnated with the epoxy solution in a mold to form a functionalized nanoscale fiber-epoxy composite.

The Functionalized Nanoscale Fibers and Functionalized Nanoscale Fiber Films

As used herein, the term "nanoscale fibers" refers to a thin, greatly elongated solid material, typically having a cross-section or diameter of less than 500 nm. As used herein, the term "film" refers to thin, preformed sheets of well-controlled and dispersed porous networks of SWNTs, MWNTs materials, carbon nanofibers CNFs, or mixtures thereof. In a preferred embodiment, the nanoscale fibers comprise or consist of carbon nanotubes, including both SWNTs and MWNT. SWNTs typically have small diameters (~1-5 nm) and large aspect ratios, while MWNTs typically have large diameters (~5-200 nm) and small aspect ratios. CNFs are filamentous fibers resembling whiskers of multiple graphite sheets or MWNTs.

As used herein, the terms "carbon nanotube" and the shorthand "nanotube" refer to carbon fullerene, a synthetic graphite, which typically has a molecular weight between about 840 and greater than 10 million grams/mole. Carbon nanotubes are commercially available, for example, from Unidym Inc. (Houston, Tex. USA), or can be made using techniques known in the art.

The nanotubes optionally may be opened or chopped, for example, as described in U.S. Patent Application Publication No. 2006/0017191 A1.

The nanotube and nanofibers optionally may be chemically modified or coated with other materials to provide additional functions for the films produced. For example, in some embodiments, the carbon nanotubes and CNFs may be coated with metallic materials to enhance their conductivity.

In one embodiment, the functionalized nanoscale fiber comprises a nanoscale fiber and an epoxide chemically bonded to a surface of the nanoscale fiber. In certain embodiments, the epoxide is covalently bonded to the surface of the nanoscale fiber.

The functionalized nanoscale fibers may be used as a chemical sensor, as atomic force microscope tips with high-sensitivity, in multifunctional membranes, or in various other applications.

In one embodiment, a functionalized nanoscale fiber film is provided that comprises a plurality of nanoscale fibers and at least one monomer or polymer chemically bonded to at least a portion of the plurality of nanoscale fibers. In certain embodiments, the monomer or polymer is covalently bonded to the surfaces of each of the nanoscale fibers. In some embodiments, the polymer is formed in-situ during the formation of the functionalized nanoscale fiber film. In one embodiment of the functionalized nanoscale fiber film, the polymer comprises an epoxy polymer (e.g., poly-glycidyl methacrylate).

In a preferred embodiment, the functionalized nanoscale fibers are present in a functionalized nanoscale fiber film in a weight percent ranging from about 1% to 90%. In one embodiment, the functionalized nanoscale fibers are present in a functionalized nanoscale fiber film in a weight percent ranging from about 28% and about 55%.

In various exemplary embodiments, the films have an average thickness from about 5 to about 100 microns, with a basis weight (area density) as low as about 21 $g/m^2$ (about 0.07 $oz/ft^2$).

Other embodiments are further illustrated below in the examples which are not to be construed in any way as imposing limitations upon the scope of this disclosure. On the contrary, it is to be clearly understood that resort may be had to various other embodiments, modifications, and equivalents thereof which, after reading the description therein, may suggest themselves to those skilled in the art without departing from the scope of this disclosure and the appended claims.

EXAMPLE 1

Functionalized Nanoscale Fiber Composites

Functionalized nanoscale fibers were produced using single-walled carbon nanotubes (100 mg), produced by HiPco, and an epoxy monomer for polymerization, glycidyl methacrylate (GMA, 1.13 g, Aldrich). The carbon nanotubes were dispersed in the GMA by ultrasonic processing in a cup-horn sonicator from Misonix Inc. for 15 minutes at a power of 30-40 watts/$m^3$. Subsequently, the mixture was transferred to a rotated flask and benzoyl peroxide (BPO, 3.9 g, Fisher Scientific) was added by stirring. The mixture was slowly heated to 75° C. and aggressively stirred for 24 hours with a magnetic stirring bar. Then, the resultant mixture was diluted with benzene and filtered through 0.2 μm a polytetrafluoroethylene (PTFE) membrane, resulting in a thin film. This solid film was substantially washed with acetone, then ground using a mortar and pestle and dispersed into a benzene for the filtration process again. This washing processing was repeated three times, then the film was annealed at 60° C. for 10 hours, and then weighed for record. The resultant film was washed by repeating the above procedures. When the recorded weight became almost constant, the film was presumed to be completely washed.

Figure 3:
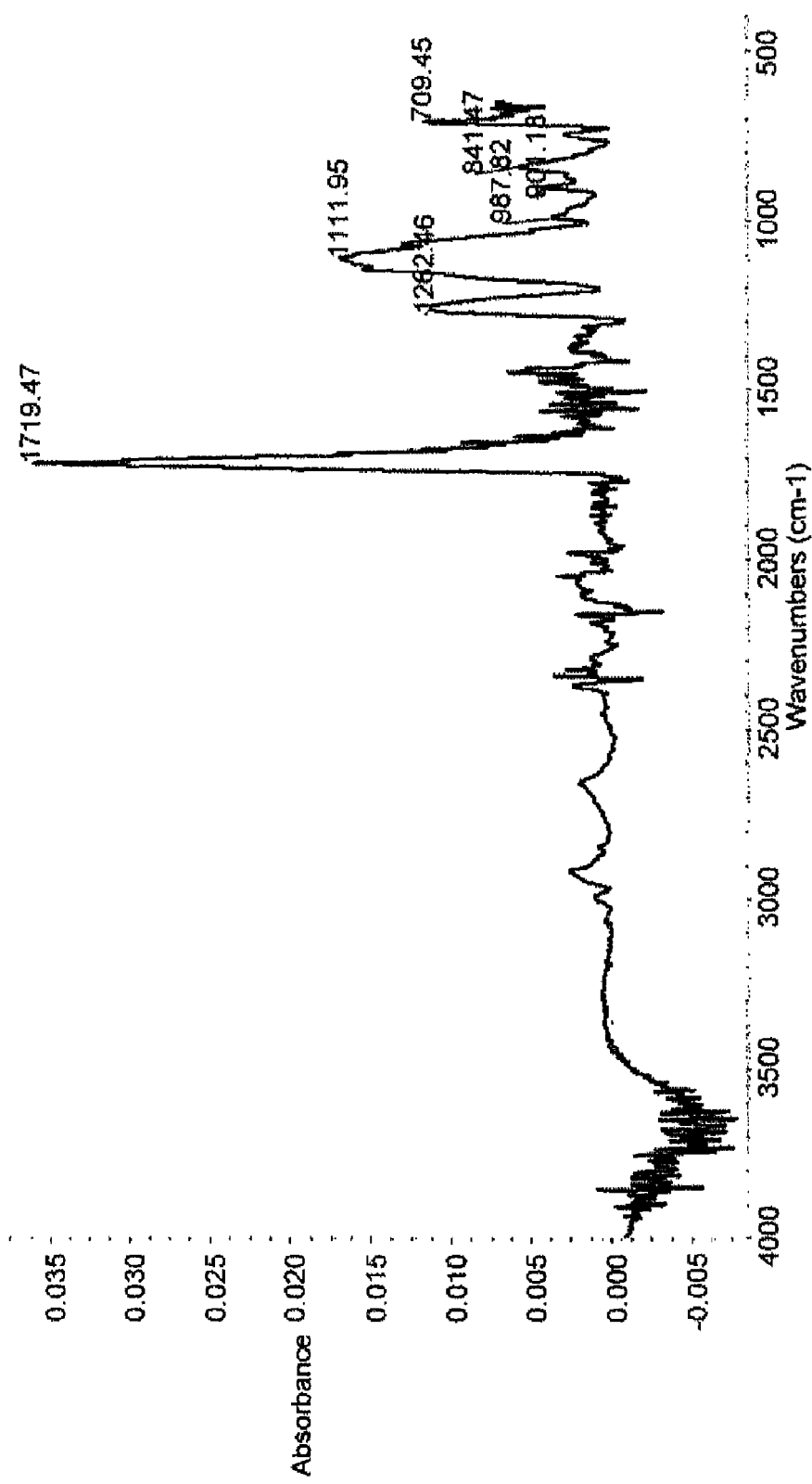
FIG. 3 shows the Fourier transform infrared spectroscopy (FT-IR) spectrum of embodiments of functionalized carbon nanotube-epoxy nanocomposites made by in-situ polymerization.

FIG. 3 shows the Fourier transform infrared spectroscopy (FT-IR) spectrum of embodiments of the functionalized carbon nanotube-epoxy nanocomposites made by in-situ polymerization. The three peaks appeared in 987, 901 and 874 cm$^{-1}$ are attributed to the vibration of epoxy groups while there was no observed vibration peak for the pristine nanotubes.

Figure 4:
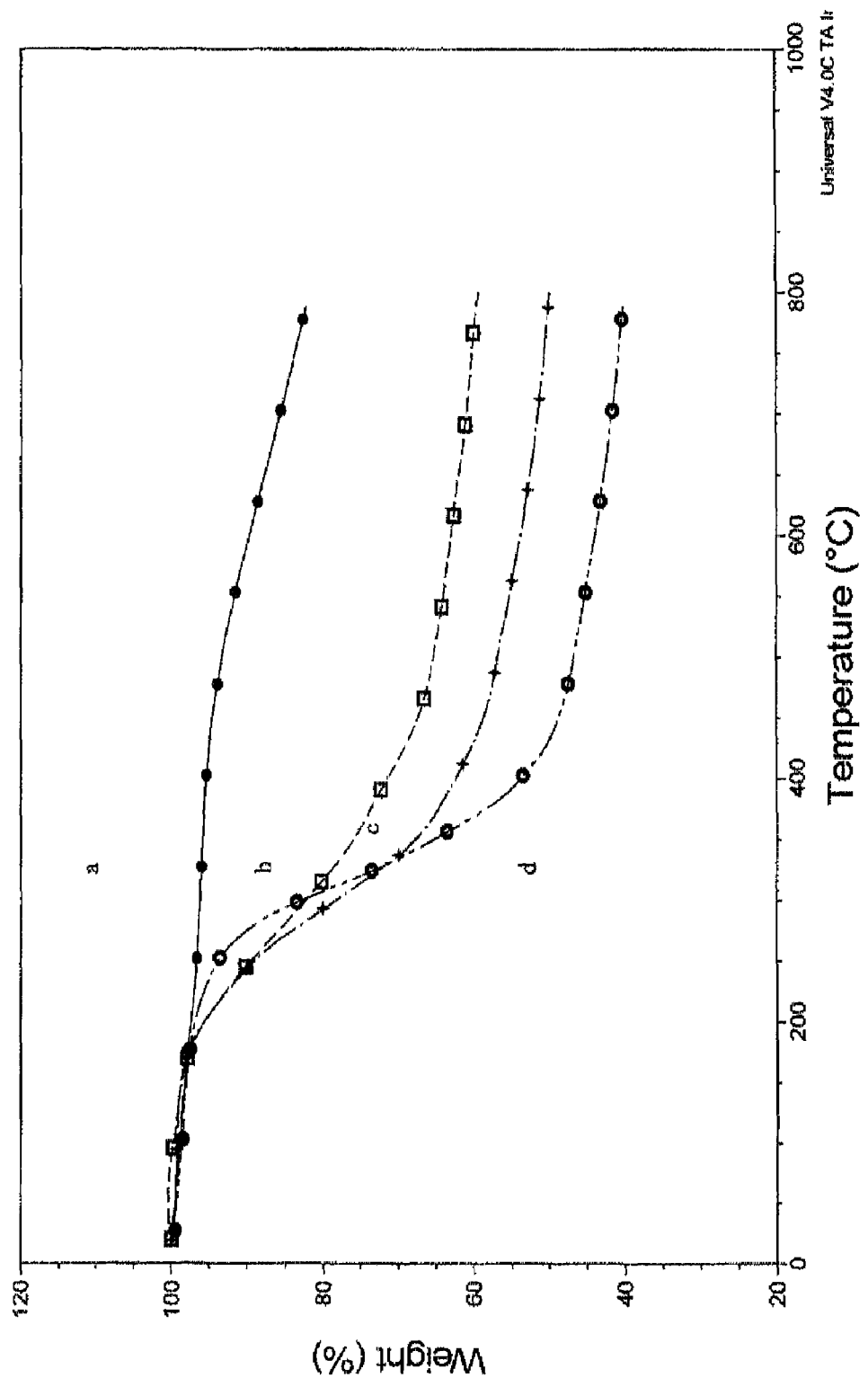
FIG. 4 is a graph showing the amount of grafted epoxide polymer on embodiments of functionalized carbon nanotubes estimated by thermogravimetric analysis (TGA).

The amount of grafted epoxide polymer on the functionalized carbon nanotubes was estimated by thermogravimetric analysis (TGA), as shown in FIG. 4. The tested samples are denoted in FIG. 4 as follows: (a) pristine SWNT (p-SWNT); (b) epoxide-grafted SWNT (x-SWNT) when the SWNT to BPO ratio (SWNT:BPO)=1:8; (c) epoxide-grafted SWNT when SWNT:BPO=1:2; (d) epoxide-grafted SWNT when SWNT:BPO=1:1. The ratio of SWNT to BPO for each of the samples was based on the mole of carbon atoms in the SWNTs and BPO molecules. The grafted poly-glycidyl methacrylate (PGMA) was completely decomposed at 600° C. while the carbon nanotubes remained. The weight percentage of grafted-PGMA on the functionalized carbon nanotubes was between about 28% to 54%.

Figure 5:
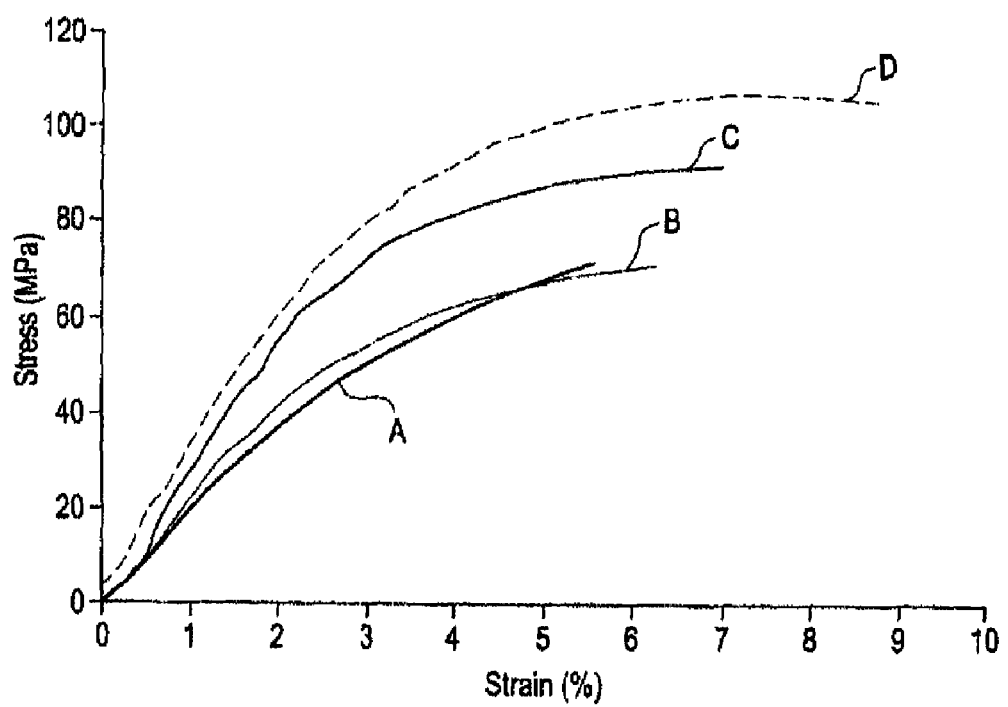
FIGS. 5-7 are graphs showing tensile test results for embodiments of functionalized carbon nanotube-epoxy nanocomposites.
Figure 6:
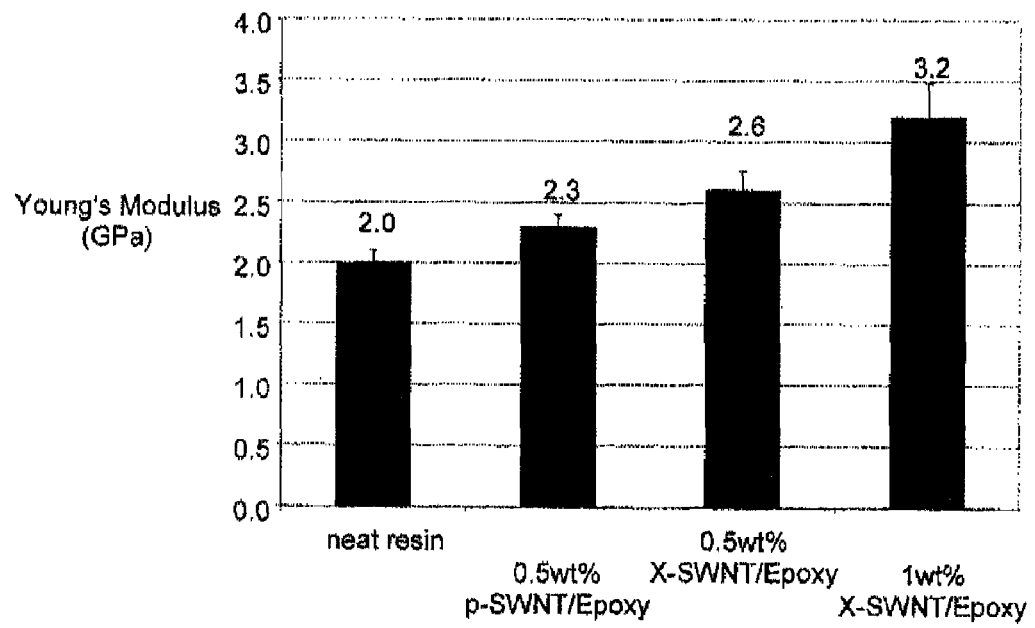
Figure 7:
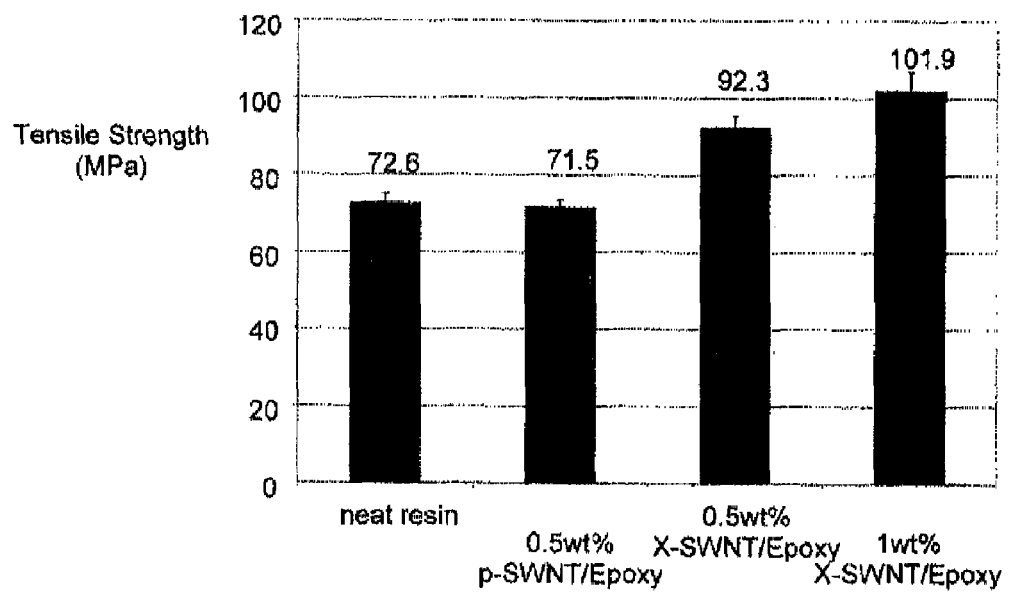

The epoxy-grafted SWNTs were further mixed with epoxy resin (Epon862)/EP-W (Shell Chemicals) with the aid of chloroform and stirring. The chloroform was removed under vacuum and the mixture was left at room temperature for 12 hours. The resulting paste was cast into a metal mold and hot-pressed at 177° C. for 2.5 hours. After post-curing at 177° C. for 2 hours, the composite sample was cut into a dumbbell shape, in accordance with ASTM D638. These standard dumbbell samples were tested using a Shimadzu tensile machine. FIG. 5 shows the tensile curve test results. The tested samples are denoted in FIG. 5 as follows: (A) neat resin; (B) p-SWNT composite; (C) 0.5 wt % x-SWNT composite; and (D) 1 wt % x-SWNT composite. The different functionalized SWNT loadings (0.5 wt % and 1 wt %) in the resultant composites, which were denoted as x-SWNT, were produced by adjusting the amount of added Epon 862 resin. FIGS. 6 and 7 show the summarized tensile results.

For the neat resin, the average tensile strength and Young's modulus were found to be 72.6 MPa and 2.0 GPa, respectively. When the pristine single-walled carbon nanotubes (p-SWNTs) were used in a reinforced epoxy composite, the test results indicated that the average strength and modulus were 71.5 MPa and 2.3 GPa, respectively. Thus, the tensile strength did not show any improvement while the modulus was slightly enhanced. However, when the epoxy-grafted SWNTs were applied in the composite with 0.5 wt % loading, the average tensile strength was increased to 92.3 MPa, which was about a 27.1% enhancement. The average modulus was enhanced to 2.6 GPa in contrast to the neat resin. The tensile strength of the 1 wt % loading x-SWNT/epoxy composite samples was found to be enhanced to 101.9 MPa, which was about a 40.3% increase. The Young's modulus was enhanced to 3.2 GPa, which was about a 60% improvement in contrast to the neat resin. The noticeable improvement of the tensile strength of the functionalized nanoscale fiber composites suggested that the functionalization of the SWNTs substantially enhanced interfacial bonding and dispersion so that load transfer was improved.

Figure 8:
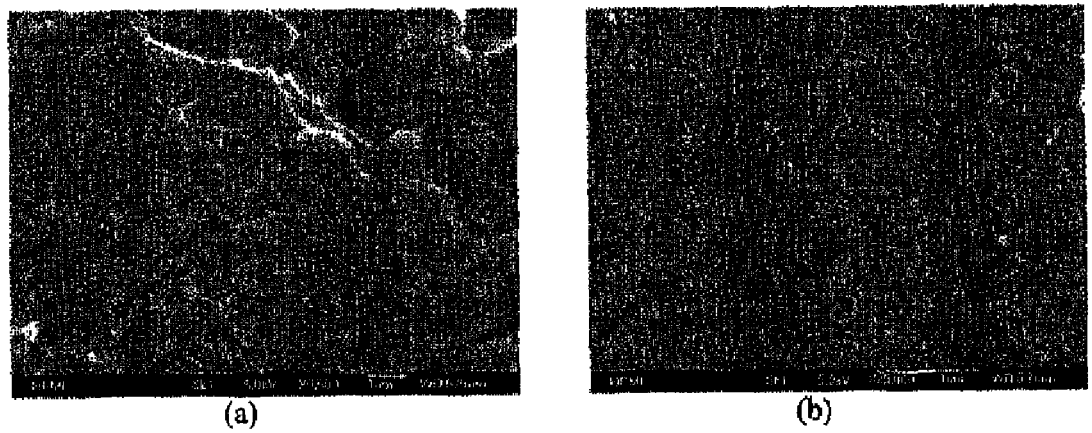
FIGS. 8A-8B are SEM micrographs of the fracture surface morphologies of (A) a pristine SWNT composite and (B) an embodiment of an in-situ functionalized SWNT composite.

FIGS. 8A-8B are SEM micrographs of the fracture surface morphologies of (a) pristine SWNT and (b) the in-situ functionalized SWNT composites that showed nanotube breakage at the composite fracture surface, indicating substantial interface bonding and load transfer improved. In addition, the functionalized SWNTs were well dispersed in the epoxy resin and embedded in the epoxy matrix.

Figure 9:
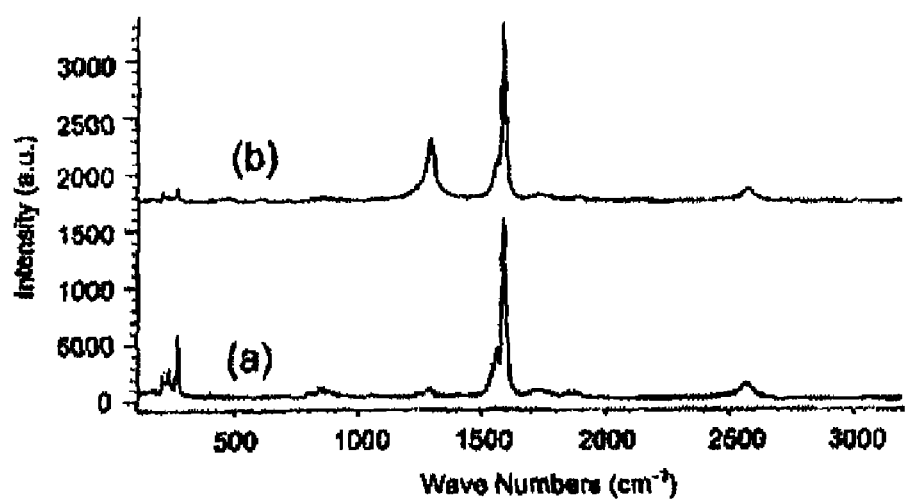
FIG. 9 shows the Raman spectroscope of (a) pristine SWNTs and (b) embodiments of epoxy-grafted SWNTs.

Raman spectroscopy is a powerful tool capable of characterizing functionalized SWNTs. Functionalization reactions might have introduced many SP$^3$ hybrids so that intensity of the disorder band (1290 cm$^{-1}$) might be enlarged in comparison with the pristine carbon nanotubes. FIG. 9 shows the Raman spectroscope of (a) pristine SWNTs and (b) epoxy-grafted SWNTs. Table 1 below summarizes the ratio of Raman band intensity of the pristine SWNTs and the epoxy-grafted SWNTs.

TABLE 1

| SWNTs | Ratio of Raman band intensity | | |
|---|---|---|---|
| | $I_{RBM}/I_{G'}$ (RBM at 267 cm$^{-3}$) | $I_D/I_{G'}$ | $I_G/I_{G'}$ |
| pristine | 0.36 | 0.04 | 0.16 |
| Epoxide-grafted | 0.08 | 0.35 | 0.09 |

An increase in the disorder band intensity of functionalized SWNTs was observed, indicating covalent bond formations between the SWNTs and poly-(glycidyl methacrylate) (PGMA) molecules. It also indicated that the intensity of radial breathing mode (RBM) model was significantly reduced and almost disappeared because the radius vibration of SWNTs was restricted by the grafted molecules. The evident undermined tengential vibrational mode (G-mode) in x-SWNT further validated the covalent functionalization through in-situ polymerization.

Figure 10:
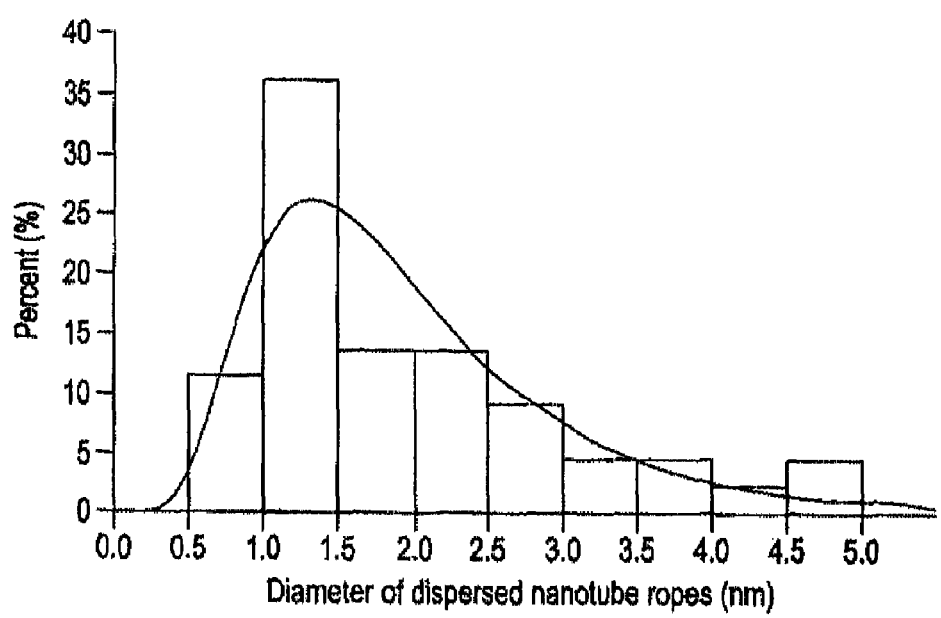
FIG. 10 is a histogram showing the section analysis and the height (diameter) of embodiments of dispersed functionalized SWNT ropes.

The functionalized SWNT were dissolved with 0.53 mg/ml in organic non-solvents, including dimethyl formamide (DMF), chloroform, and methylene chloride. The solution was stable and uniform. The solution was sampled and characterized with atomic force microscopy (AFM). The AFM image was further investigated by section analysis and the height of the nanotube ropes (diameter of the dispersed functionalized SWNT ropes) was extracted to the histogram shown in FIG. 10. The statistical results indicated that more than 60% of the ropes were well dispersed with diameters less than 2 nm. Generally, the nanotube ropes with diameters less than 2 nm were regarded as individual tubes. Therefore, most of the SWNTs were dispersed into the individual state.

Additional information regarding the functionalized nanoscale fibers and nanoscale fiber films produced in this example can be found in Wang et al., "Reinforcing Polymer Composites with Epoxide-Grafted Carbon Nanotubes," Nanotechnology, 19 (Feb. 4, 2008), pages 1-7, which is hereby incorporated by reference in its entirety.

The results indicated that the developed methods were effective to modify nanotube surface characters for enhancing dispersion and interfacial bonding for improving mechanical properties of the resultant nanocomposites.

EXAMPLE 2

Epoxide-Group Grafting Functionalization for High Loading Long MWNT Nanocomposites A series of experiments were conducted to determine the affect of reaction parameters on the degree of functionalization (DOF) of the epoxide-group grafting of millimeter-long MWNTs from suppliers Cnano and Nanocomp.

In these experiments, glycidyl methacrylate, stabilized 97%, was purchased from Fisher Scientific Inc. Benzoyl peroxide (97%, purchased from Sigma-Aldrich Inc.) was used as a free radical initiator. Benzene was used as the non-solvent. The formation of benzoyl radicals initialized the polymerization of GMA was performed in a −8° C., stirred heat and temperature controlled silicone oil bath for 24 hours, following reaction formula below:

MWNTs+BPO+GMA→GMA-MWNTs.

Figure 11:
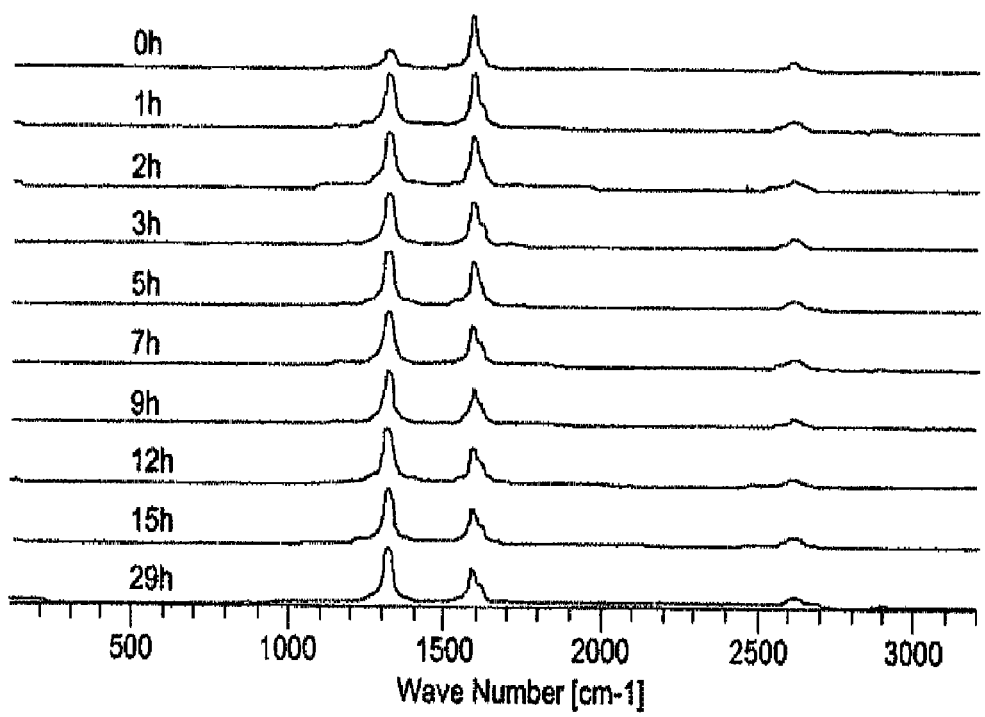
FIG. 11 is a graph showing Raman spectra of embodiments of epoxide-grafted MWNTs.
Figure 12:
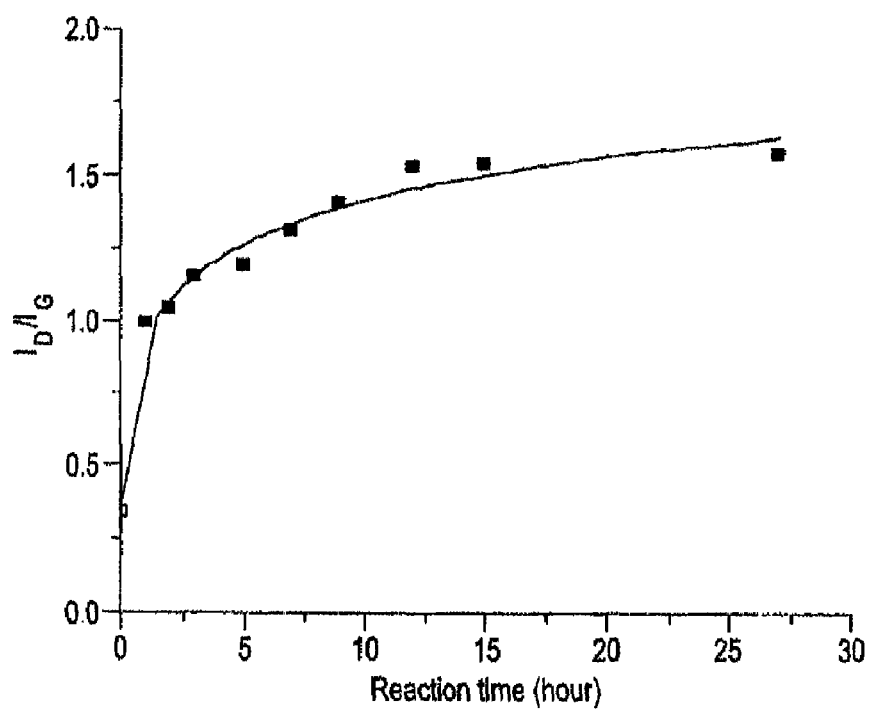
FIG. 12 is a graph of the R-values ($I_D/I_G$) for embodiments of epoxide-grafted MWNTs reacted for various reaction times.

For example, 100 mg of MWNT, 1.136 g of GMA, 1.95 g of BPO, and 300 ml of benzene was used. The effect of reaction time on the DOF was studied through samples of varying MWNT treatment time, from 1 hr to 29 hours. Raman spectrum analysis was used to reveal the DOF of the resultant samples. FIG. 11 shows the Raman spectra of the resultant epoxide-grafted MWNTs. With the increase in reaction time, the disorder band (D band) intensity of the MWNTs increased, which indicated more covalent bonds were formed between the MWNTs and GMA molecules. The R-value ($I_D/I_G$), the ratio of Raman band intensity, increased with the reaction time from 0.34 for the pristine to 1.58 for the samples undergoing 29 hour reaction, as shown FIG. 12. The results indicated non-linear changes of the DOF with reaction time. Based on the results, the DOF may be tailored by controlling reaction time for different applications.

EXAMPLE 3

Epoxide-Group Grafted MWNT Nanocomposites

In this example, a 15-hour reaction time was used to achieve adequate DOF for improving dispersion and interfacial bonding of functionalized nanoscale fibers produced by the procedure described in Example 2. Epon 862 epoxy and curing agent W (diethyltoluenediamines) from E.V. Rubber Inc. were used as received for nanocomposite fabrication.

Figure 13:
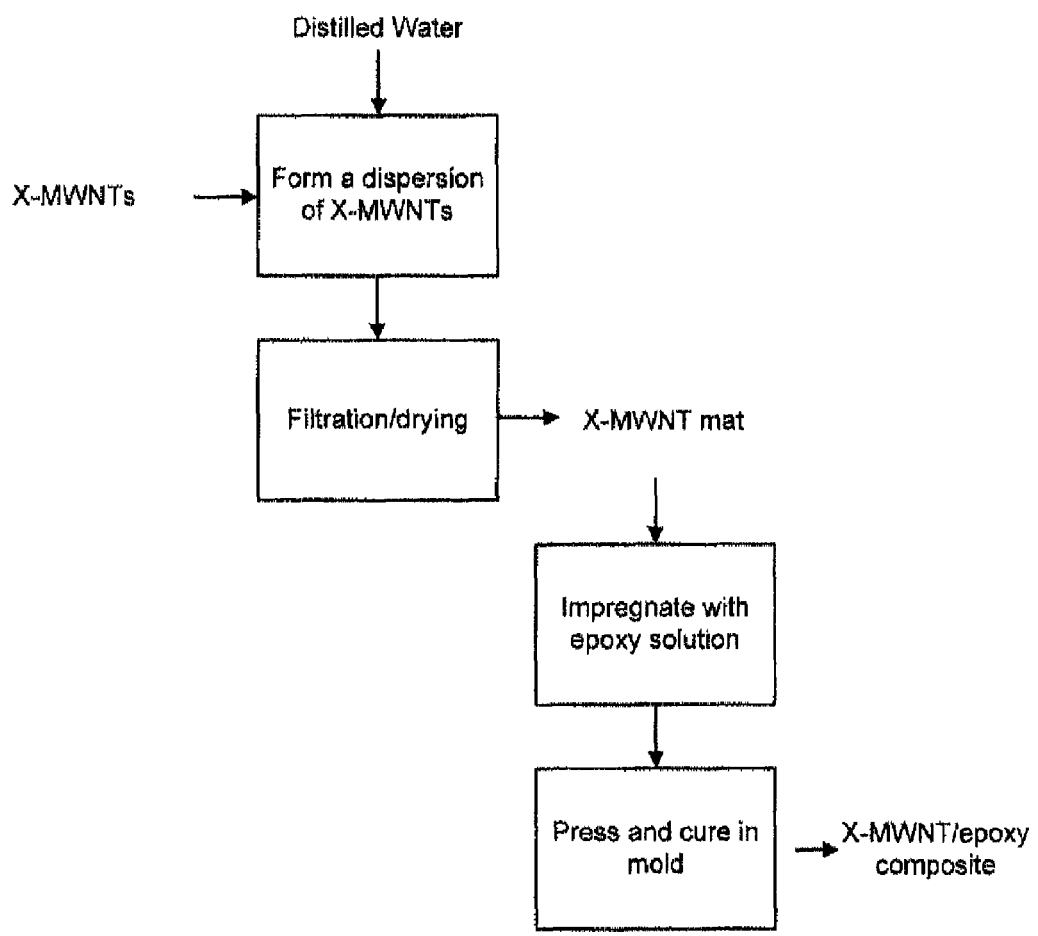
FIG. 13 is a process flow diagram illustrating one embodiment of the process for fabricating nanocomposites comprising functionalized nanoscale fibers.

FIG. 13 is a process flow diagram illustrating the process for fabricating the nanocomposites comprising the functionalized nanoscale fibers. The washed x-MWNT cakes or mats were impregnated with a 35 wt % epoxy solution, placed in the lower portion of a mold under a vacuum in a 180° F. oven, and then hot pressed for 30 minutes at 190° F. and then 4 hours at 35° F. to achieve high nanotube loading. Five nanocomposite samples of different MWNT types and loading were fabricated.

Figure 14:
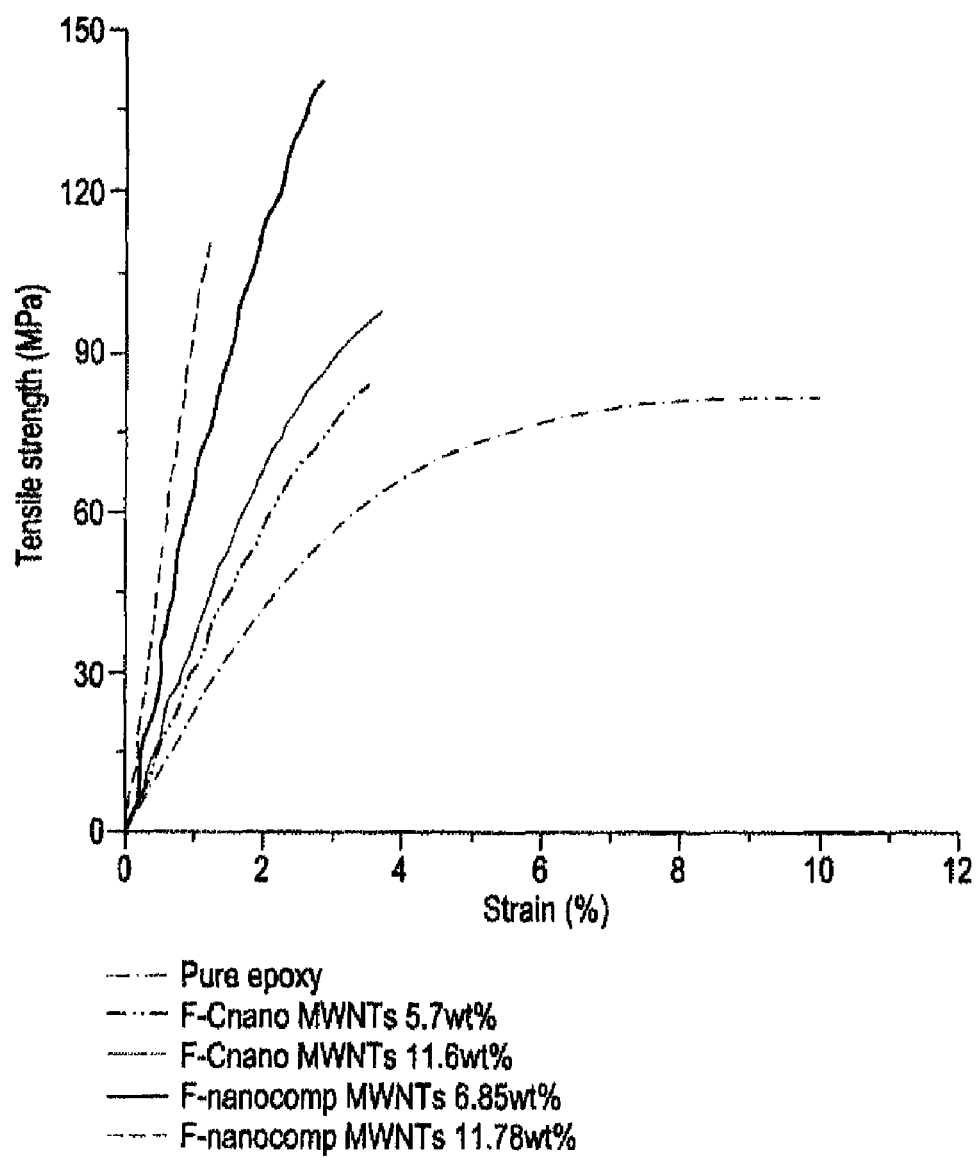
FIG. 14 is a graph showing tensile test stress-strain curves for embodiments of functionalized carbon nanotube-epoxy nanocomposites.
Figure 15:
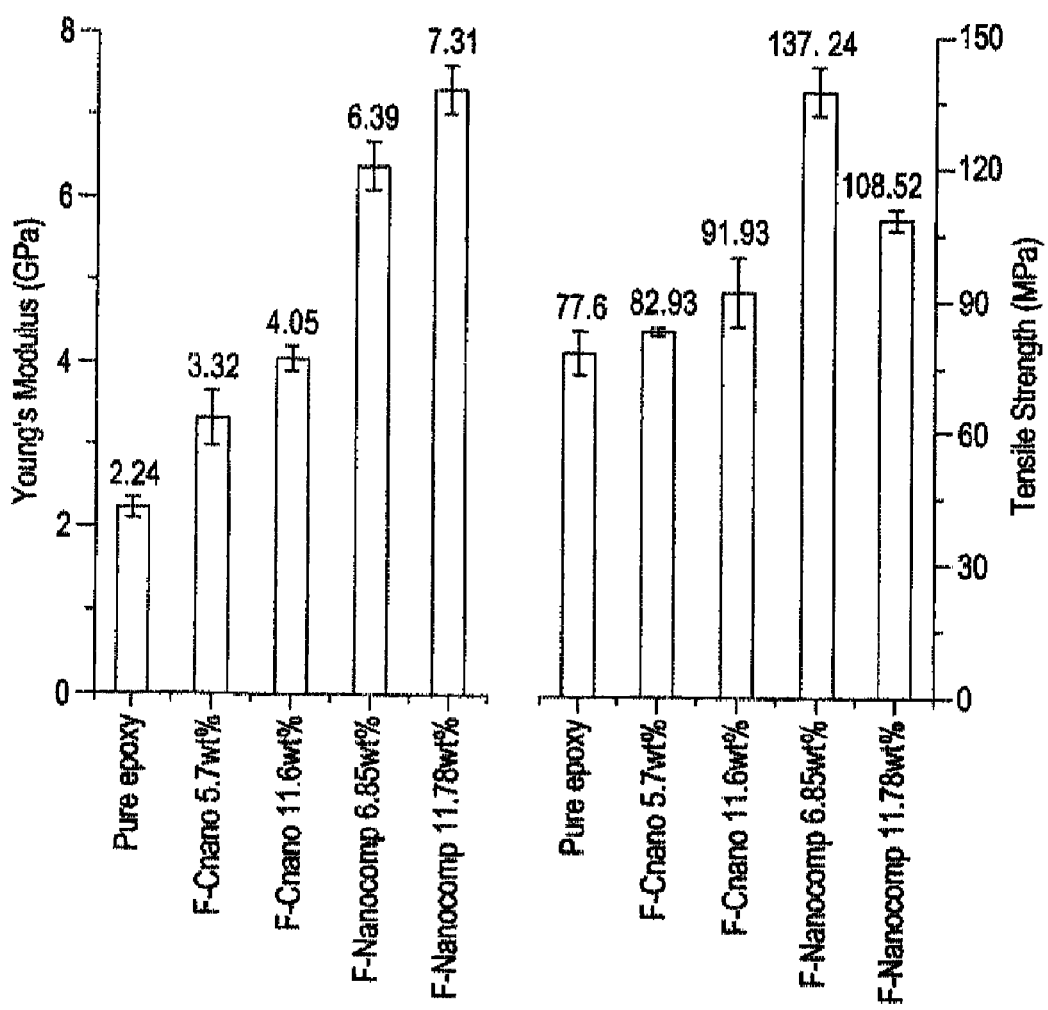
FIG. 15 is a graph showing Young modulus values of embodiments of functionalized carbon nanotube-epoxy nanocomposites.

Tensile property tests were conducted using a Shimadzu material testing machine (AGS-J) according to standards set by ASTM D 638-03. The samples were machined to form a dog-bone shape. The crosshead speed of the test was 1 mm/min, and the gauge length was 20 mm. Typical tensile stress-strain curves are shown in FIG. 14. The Young's modulus and tensile strength of the samples are shown in FIG. 15. The results show that with the functionalized MWNT, relatively high MWNT loading in the nanocomposites can be realized. The functionalized Nanocomp MWNT (x-Nanocomp) composites show a noticeable increase in mechanical properties. The modulus of nanocomposite samples of 11.78 wt % functionalized Nanocomp MWNTs (x-Nanocomp) was as high as 7.31 GPa, and the strength of the samples of 6.85 wt % F-Nanocomp MWNTs reached 137.2 MPa. Compared to information found in literature, these results showed noticeable improvements in the mechanical properties of MWNT/epoxy nanocomposites.

Figure 16:
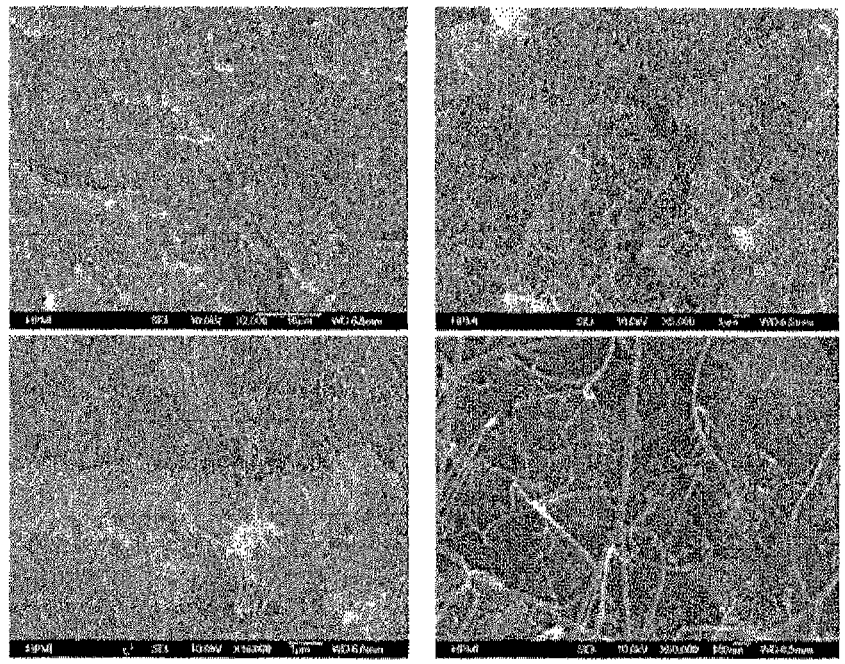
FIGS. 16 and 17 are SEM micrographs showing the fracture surfaces of embodiments of functionalized carbon nanotube-epoxy nanocomposites.
Figure 17:
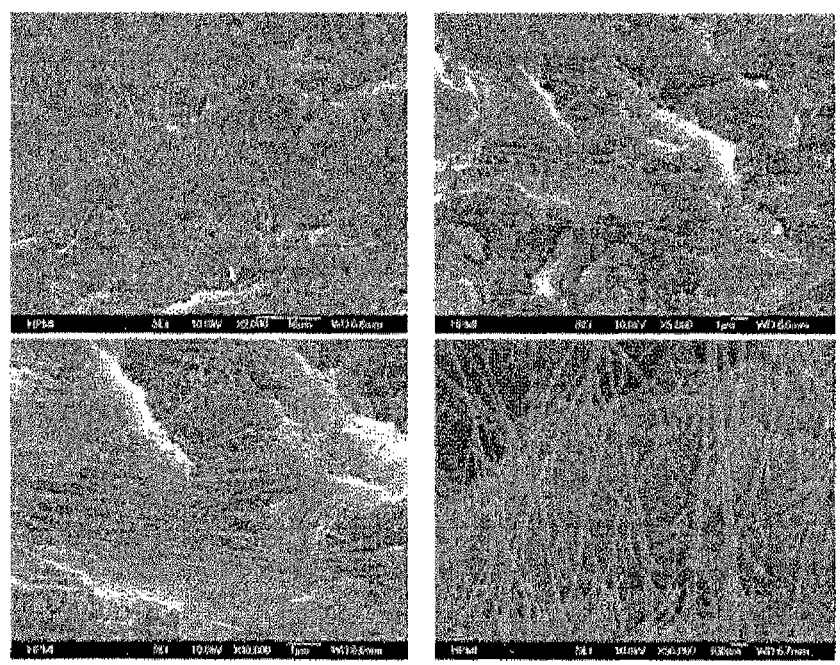

FIGS. 16 and 17 show the fracture surfaces of the tested samples, validating that relatively uniform MWNT dispersion was achieved. The good interfacial bonding between the epoxy resin and nanotubes and stretching of nanotubes to form alignment patterns indicated improved interfacial bonding and load transfer.

We claim:

1. A method for functionalizing nanoscale fibers comprising:
reacting a plurality of nanoscale fibers with at least one monomer comprising an epoxide functional group to chemically bond the at least one monomer to unmodified surfaces of the nanoscale fibers to form functionalized nanoscale fibers, wherein the nanoscale fibers comprise single-walled carbon nanotubes, multi-walled carbon nanotubes, or a combination thereof.

2. The method of claim 1, further comprising:
polymerizing the at least one monomer to form at least one polymer.

3. The method of claim 2, wherein the steps of reacting and polymerizing occur substantially simultaneously.

4. The method of claim 2, further comprising:
before the step of reacting, dispersing the nanoscale fibers in a liquid which comprises the at least one monomer; and
after the steps of reacting and polymerizing, removing at least a substantial portion of the liquid.

5. The method of claim 4, wherein the step of removing the liquid comprises filtering, vaporizing, or a combination thereof.

6. The method of claim 4, wherein the step of removing the liquid comprises forming a functionalized nanoscale fiber film composed of the functionalized nanoscale fibers.

7. The method of claim 1, wherein the step of reacting comprises adding a catalyst to the at least one monomer.

8. The method of claim 7, wherein the catalyst comprises a peroxide.

9. The method of claim 8, wherein the peroxide comprises benzoyl peroxide.

10. The method of claim 1, further comprising washing the functionalized nanoscale fibers.

11. A method for functionalizing nanoscale fibers comprising:
reacting a plurality of nanoscale fibers with at least one monomer comprising an epoxide functional group to chemically bond the at least one monomer to unmodified surfaces of the nanoscale fibers to form functionalized nanoscale fibers,
wherein the nanoscale fibers comprise single-walled carbon nanotubes, multiple-walled nanotubes, carbon nanofibers, or a combination thereof; and the at least one monomer comprises glycidyl methacrylate, (7-octenyl) oxirane, 1,2-epoxy-5-hexene, 3,4-epoxy-1-butene, or a combination thereof.

12. The method of claim 11, further comprising:
polymerizing the at least one monomer to form at least one polymer.

13. The method of claim 12, wherein the steps of reacting and polymerizing occur substantially simultaneously.

* * * * *